(No Model.)
J. L. LEAVITT & E. BIBO.
BICYCLE ALARM.
No. 584,179. Patented June 8, 1897.
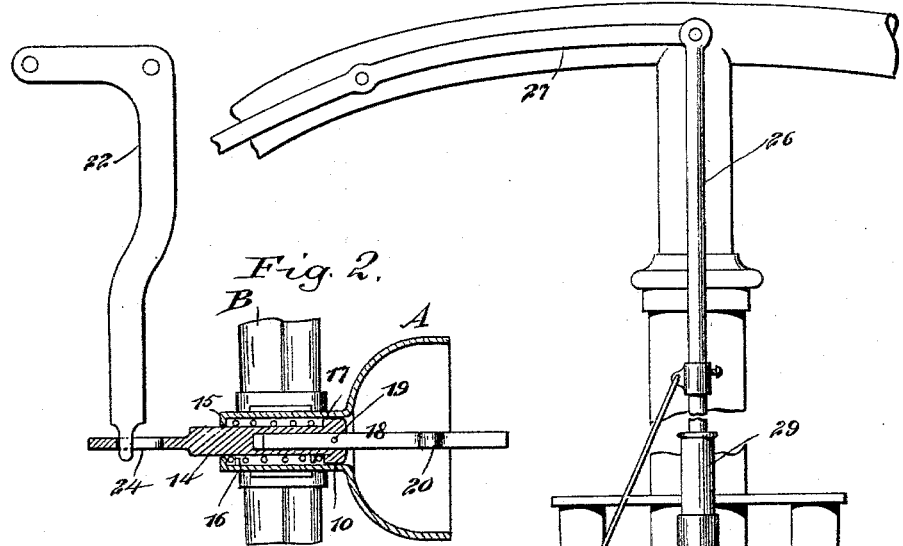
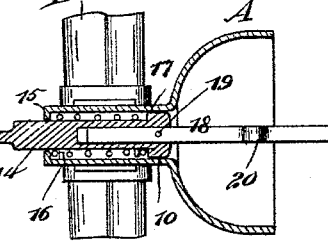
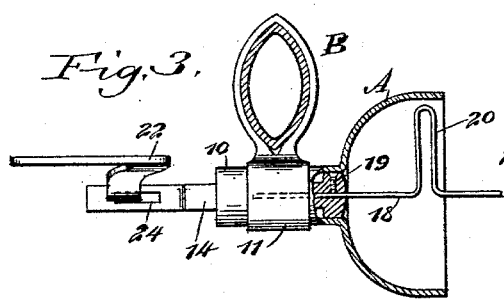
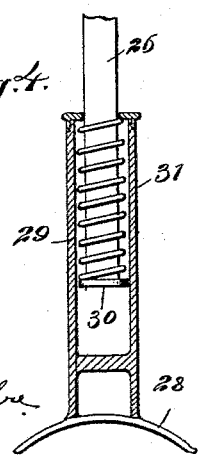
WITNESSES:
INVENTORS
J. L. Leavitt
E. Bibo
BY
ATTORNEYS.

UNITED STATES PATENT OFFICE.

JOHN LAWLER LEAVITT, OF ALBUQUERQUE, AND EMIL BIBO, OF BERNA-LILLO, TERRITORY OF NEW MEXICO.

BICYCLE-ALARM.

SPECIFICATION forming part of Letters Patent No. 584,179, dated June 8, 1897.

Application filed August 12, 1896. Serial No. 602,543. (No model.)

*To all whom it may concern:*

Be it known that we, JOHN LAWLER LEAVITT, of Albuquerque, and EMIL BIBO, of Bernalillo, in the county of Bernalillo and Territory of New Mexico, have invented a new and Improved Alarm Device for Bicycles, of which the following is a full, clear, and exact description.

The object of our invention is to provide an alarm device especially adapted for application to a bicycle which will be operated through the medium of a rotating wheel of the machine, being practically automatic, and to so construct the alarm device that it will be simple, durable, and economic and may be so arranged as to give an intermittent or a continuous alarm or remain silent.

Another object of the invention is to provide a means whereby the alarm given may be similar to that of an alarm-clock, a gong or its equivalent being in this case employed, or whereby the alarm may be in the nature of a buzzing, whistling, or rattling sound, as may be desired.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a sectional view through the steering-wheel of a bicycle, illustrating a portion of the fork and a portion of the steering device, the improved alarm device being illustrated in front elevation and as applied to a member of the fork. Fig. 2 is a vertical central section through the alarm device. Fig. 3 is a horizontal section through one of the members of the fork of the bicycle, illustrating the alarm device as partially in side elevation and partially in horizontal section; and Fig. 4 is a detail sectional view of a brake which may be operated in connection with the alarm.

In carrying out the invention a gong A is employed provided with a tubular hub 10, and the said hub has a clip 11 applied thereto, or other form of fastening device, whereby the gong may be held securely upon a portion of the frame of a bicycle. In the drawings the alarm device is represented as secured to a member 12 of the front fork B, and the open portion of the gong is made to face the spokes 13 of the front wheel C of the bicycle near the rim of the said wheel.

A plunger 14 is mounted to slide in the hub of the gong, and the said hub is partially closed at its outer end to form a shoulder 15, against which a spring 16 may have bearing, which spring is coiled around the plunger within the hub of the gong and has also bearing against a shoulder 17, formed on the plunger near that end which is adjacent to the gong, the spring being secured at one end to the hub and at the opposite end to the plunger.

A tongue 18, preferably made of a spring material, such as steel, has one of its ends adjustably secured in the inner end of the plunger 14, the adjustment being made through the medium of a screw 19 or the equivalent of the same. The tongue 18 is adapted to vibrate and extends outward a predetermined distance beyond the open portion of the gong, and between the ends of the tongue the material thereof is bent upon itself or otherwise manipulated to form a hammer or clapper 20; but if in practice it is found desirable more than one of such hammers may be employed.

The projecting end of the vibrating tongue 18 is adapted to be brought into engagement with projections or lips 21, preferably of a spring material, which are secured upon the spokes of the wheel C near its rim, and the spring 16 normally acts to hold the vibrating tongue out of engagement with the lips 21 of the wheel, and according to the number of lips placed upon the wheel the alarm will be intermittent or continuous when the tongue is brought to a position to be engaged by the said lips.

A lever 22 (shown as an angle-lever) is fulcrumed upon a suitable support 23, secured to the frame of the bicycle above the alarm device, and one member of this lever is made to enter a slot 24 in the outer end of the plunger 14. The opposite end of the lever may be pressed by the foot or hand to force the vibratory tongue to an engagement with the projections from the wheel, or the said lever may be otherwise manipulated—as, for example, the upper end of the lever may be connected by a link 25 with a rod 26, located in front of the head of the bicycle and extending up to the handle-bar D, at which point the rod 26 is pivotally attached to a lever 27, fulcrumed on the handle-bar, and a rack is also placed on the handle-bar or the equivalent thereof to hold the lever 27 in the position to which it may be carried. The rod 26 has vertical movement and may be used to operate a brake, in which event the brake-shoe 28 is attached to a cylinder 29, having sliding movement on the fork of the machine, and the rod 26 enters the said cylinder and terminates in a head 30, (shown in Fig. 4,) while a spring 31 is coiled around that portion of the rod within the cylinder, bearing upon the head 30 and against the upper end of the cylinder. The spring will serve to return the rod 26 to its upper position after it has been pressed downward, and the rod may travel downward some distance before its head will strike the bottom of the brake-cylinder to cause an application of the brake-shoe to the periphery of the wheel, and this idle movement on the part of the sliding rod 26 will be sufficient to impart enough throw to the angle-lever 22 to carry the tongue 18 in the path of the lips or projections 21 on the wheel C.

Ordinarily the tongue is carried in direction of the wheel only far enough to engage with the projections from the wheel and yet preserve the hammer within the gong, so as to sound the alarm as the tongue is vibrated, but the tongue may be carried far enough in direction of the wheel to take the hammer entirely out of the gong, in which event as the wheel revolves the vibratory movement of the tongue will cause a buzzing sound, which will be a sufficient alarm, but will not operate on the gong. This device is especially designed for bicycles which are ridden largely at night or in places where pedestrians are frequently encountered.

While we have described our invention in connection with a bicycle, we do not wish to be understood as limiting it thereto, for it is equally applicable to other wheeled vehicles.

Having thus described our invention, we claim as new and desire to secure by Letters Patent—

1. An alarm device for vehicles, consisting of a vibratory tongue secured in said gong, projections on the spokes of the traveling wheel of the vehicle, and means for throwing said tongue in direct contact with said projections, substantially as set forth.

2. An alarm device for bicycles, consisting of a vibratory tongue, a gong in which the said tongue is located, the tongue being provided with a hammer-section for engagement with the gong, and an end portion of the said tongue being arranged for engagement with the wheel of a bicycle to receive vibratory movement therefrom, as and for the purpose set forth.

3. An alarm device for bicycles, consisting of a gong, means for attaching the gong to the frame of the machine, a vibratory tongue located within the gong and having a portion thereof capable of extending beyond the gong, trip devices adapted for engagement with the aforesaid tongue, and means for attaching the said trip devices to a wheel of a bicycle, as and for the purpose specified.

4. In an alarm device for bicycles, a gong, a vibratory tongue located within the gong and provided with a hammer-section, a plunger with which the said tongue is connected, and means, substantially as described, for operating the plunger, as and for the purpose specified.

5. The combination, with an alarm device, a plunger whereby the said device is carried in a position to be operated, a brake, a plunger operating the brake, and a connection between the said brake-plunger and the plunger of the alarm, the connection being so formed that the alarm may be carried to a position to be actuated without operating the brake, or whereby the brake and plunger may be operated together, as and for the purpose specified.

6. An alarm for vehicles, consisting of a gong, a vibrating tongue provided with a hammer-section within the gong and having its end protruding out of the same, projections on the spokes of a traveling wheel of a vehicle, and means for throwing the hammer-section outside of said gong and said protruding end in contact with said projections, as set forth.

7. In an alarm device for vehicles, the combination with the gong attached to the frame of the vehicle and projections secured to the driving-wheel of the same, of the vibratory tongue located in said gong, the spring-controlled plunger connected with the tongue and holding said tongue normally out of contact with said projections, and the lever connected with the plunger and arranged to move the same against the action of said spring and throw the tongue in engagement with the projections, as set forth.

8. An alarm device for bicycles, consisting of the gong secured to the front fork, its vibratory tongue, the projections on the spokes of a traveling wheel, the plunger connected with the tongue, the angle-lever by which said plunger is operated, and the link connecting the lever-arm with the brake-rod of the bicycle, as and for the purpose set forth.

JOHN LAWLER LEAVITT.
EMIL BIBO.

Witnesses:
JOSEPH BIBO,
HENRY BROWN.